US012391163B2

(12) United States Patent
Mu et al.

(10) Patent No.: US 12,391,163 B2
(45) Date of Patent: Aug. 19, 2025

(54) EXPANDABLE ADAPTIVE CUP HOLDER (71) Applicant: SHENZHEN GLAMORTECH INDUSTRIAL CO., LTD, Shenzhen (CN)

(72) Inventors: Pengbo Mu, Shenzhen (CN); Shikun Guo, Shenzhen (CN)

(*) Notice: Subject to any disclaimer, the term of this patent is extended or adjusted under 35 U.S.C. 154(b) by 26 days.

(21) Appl. No.: 18/393,706

(22) Filed: Dec. 22, 2023

(65) Prior Publication Data
US 2025/0135980 A1  May 1, 2025

(30) Foreign Application Priority Data

Oct. 31, 2023  (CN) .......................... 202311431485.5

(51) Int. Cl.
B60N 3/10  (2006.01)
(52) U.S. Cl.
CPC .................... B60N 3/106 (2013.01)
(58) Field of Classification Search
CPC .................................................. B60N 3/106
USPC ...................................................... 248/311.2
See application file for complete search history.

(56) References Cited

U.S. PATENT DOCUMENTS

| 5,154,380 | A  | * | 10/1992 | Risca  | B60N 3/106 248/154 |
| 6,705,580 | B1 | * | 3/2004  | Bain   | B60N 3/106 248/311.2 |
| 7,416,161 | B2 | * | 8/2008  | Shin   | B60N 3/106 248/311.2 |
| 7,597,300 | B2 | * | 10/2009 | Harada | B60N 3/106 248/312.1 |
| 8,579,149 | B2 | * | 11/2013 | Henke  | B60N 3/10 220/8 |
| 8,807,504 | B2 | * | 8/2014  | Ogawa  | B60N 3/106 220/737 |
| 2004/0118860 | A1 | * | 6/2004 | Leopold | B60N 3/106 220/737 |

* cited by examiner

Primary Examiner — Anita M King
(74) Attorney, Agent, or Firm — AGMON LAW PTE LTD (57) ABSTRACT The present application provides an expandable adaptive cup holder, wherein the expandable adaptive cup holder comprises a cup holder body and a blade slidably connected to the cup holder body. The cup holder body comprises an elastic potential energy storage component arranged inside the cup holder body, and a triggering component arranged on the cup holder body. The triggering component comprises a contacting portion and a triggering portion extending into the cup holder body and contacting with the elastic potential energy storage component. The expandable adaptive cup holder of the present application can release elastic potential energy after a user puts a water cup in, the blades are contracted to clamp the outer edge of the cup wall, and the purpose of adapting to the size of the water cup can be achieved.

10 Claims, 8 Drawing Sheets

EXPANDABLE ADAPTIVE CUP HOLDER

CROSSED REFERENCE TO RELATED APPLICATIONS

The present application claims the priority to Chinese application No. 2023114314855, filed on Oct. 31, 2023, the disclosure of which is incorporated herein by reference in its entirety.

TECHNICAL FIELD

The present application relates to the field of vehicle technology, specifically to an expandable adaptive cup holder.

BACKGROUND

In people's lives, in order to meet the needs of travel, people often carry various types of water cups. With the growth of the travel population, in order to meet the requirements of convenience and comfort, people have added cup slots for putting water cups in different life application scenarios.

However, the cup slot usually only has a fixed size, but different groups of people use different sizes and shapes of water cups, which may lead to the size of the water cup being too big to put into the cup slot, or if the size of the water cup is small and after putting it into the cup slot, there will be a certain gap between the water cup and the cup slot. When going out for sports or long-distance travel, people often need to carry large capacity water bottles. At this time, the water bottle that cannot be putted in the cup slot become inconvenient to use and carry. Or there is a certain gap between the cup and the cup slot, which may cause a problem that the water cup collides and breaks due to the detachment of the water cup from the cup slot, bringing some trouble and loss to people's travel.

SUMMARY

In view of this, the embodiments of the present application provide an expandable adaptive cup holder to address the issue of non-adjustable cup slots built-in existing vehicles. When the size of the water cup does not match that of the built-in cup holder, and the size of the cup slot built-in the vehicle cannot be fixed, the expandable adaptive cup holder can be installed, and the size of which can be automatically adjusted to adapt to the water cup, making it more convenient.

To achieve the above purposes, the technical solutions of the present application are as follows.

An expandable adaptive cup holder, comprising a cup holder body and a blade slidably connected to the cup holder body, wherein the cup holder body comprises an elastic potential energy storage component arranged inside the cup holder body, and a triggering component arranged on the cup holder body, the triggering component comprises a contacting portion and a triggering portion extending into the cup holder body and contacting with the elastic potential energy storage component.

Further, the cup holder body comprises an upper plate, a middle plate and a lower plate, and the triggering rod passes through the upper plate and the middle plate and contacts with the elastic potential energy storage component.

Further, the elastic potential energy storage component comprises a braking structure, and the triggering rod contacts with the braking structure.

Further, the braking structure is arranged between the middle plate and the lower plate, and a first wedge-shaped and tooth-shaped structure is arranged on a first surface of the braking structure.

Further, a first groove corresponding to the triggering rod is arranged on the first surface of the braking structure.

Further, a supporting rod is arranged on a second surface of the braking structure.

Further, a second wedge-shaped and tooth-shaped structure corresponding to the first wedge-shaped and tooth-shaped structure is arranged on a third surface of the middle plate facing the first surface of the braking structure.

Further, a second groove corresponding to the supporting rod is arranged on the lower plate, and a first elastic member is arranged between the supporting rod and the second groove, to make the first wedge-shaped and tooth-shaped structure and the second wedge-shaped and tooth-shaped structure come into contact.

Further, the elastic potential energy storage component comprises a second elastic member arranged between the upper plate and the middle plate, a first supporting point for fixing is arranged on the upper plate, a second supporting point for fixing is arranged on the middle plate, and both ends of the second elastic member are fixed and connected to the first supporting point for fixing and the second supporting point for fixing respectively.

Further, a third tooth-shaped structure engaging with a gear arranged on the upper plate is arranged on the blade.

Further, a fourth tooth-shaped structure engaging with the gear is arranged on the middle plate.

The advantageous effects of the embodiments of the present application are as follows.

According to the adaptive cup holder, the blades surround the clamping space of the adaptive cup holder, the elastic tongue is located at the middle portion of the blade, and a part of the gear structure at the bottom portion of the blade is connected to the gear structure in the cup holder body, which are coupled to expand and contract, thereby the blade is moved towards or away from the center of the circle.

The cup holder body is composed of the following six parts: the triggering component, the upper plate, the middle plate, the lower plate, the gear structure, the braking structure and the elastic structure. The braking structure is built-in between the lower plate and the middle plate, and a spring is fixed to it to connect it to the tooth-shaped structure of the middle plate. The gear structure is built in the upper plate and engaged with the part of the gear structure of the blade to control the expanding and contracting of the blade. The elastic structure is built-in between the upper plate and middle plate, utilizing the stored elastic potential energy to achieve the purpose of automatically contracting.

The base including a rotating structure is installed inside the cup slot, and allows the adaptive cup holder to be fixed.

Firstly, the upper plate of the cup holder body has the slid rail, and the blade is installed on the slid rail. The tooth-shaped structure of the blade is connected to the gear structure installed on the upper plate, allowing the blades to synchronously expand and contract, and move towards or away from the center of the circle at the same time.

Secondly, the middle plate has three identical tooth-shaped structures with an angle of 120 degrees each, which are connected to the gear structure installed on the upper plate to ensure the three gears to synchronously move. The elastic structure (such as a spring) is built-in between the upper plate and the middle plate, and both ends thereof are connected to the supporting points for fixing on the upper plate and the middle plate respectively, which plays a role of simultaneously compressing and releasing. Pulling the blades or rotating the middle plate can both cause the gear structure to rotate, the blades are driven to move away from the center of the circle to expand the clamping space and compress the elastic structure at the same time. The purpose of storing energy in the elastic structure can be achieved.

Thirdly, by installing the elastic objects such as springs between the braking structure and the lower plate, the wedge-shaped and tooth-shaped structure of the braking structure is engaged with the wedge-shaped and tooth-shaped structure of the middle plate. The middle plate is controlled to twist only in a clockwise direction to expand the clamping space of the blades, and not rotate back by elongating the elastic structure to release energy, when the middle plate is combined with the braking structure. The blade cannot contract and clamp the water cup. The purpose of fixing the degree of opening and closing of the blade and making it easy to put a water cup in can be achieved.

Fourthly, the triggering portion (the rod) of the triggering component passes through the upper and middle plates, and is directly connected to the braking structure. When the triggering component at the upper part of the cup holder body is affected by downward force (such as the gravity of the water cup or the pressure from hands), the triggering component moves downwards, which further causing the braking structure to move downwards, so that the wedge-shaped and tooth-shaped structure of the braking structure detaches from the wedge-shaped and tooth-shaped structure of the middle plate. A role of preventing the elastic structure from extending and releasing the energy cannot play. The elastic structure elongates and releases the stored elastic potential energy, so that the middle plate rotates in the counterclockwise direction under the action of the elastic structure. The internal gear structure is driven to rotate, thereby the blade is contracted and clamp the outer edge of the cup wall. The purpose of automatically contracting the blade and adapting to the size of the cup can be achieved.

According to the adaptive cup holder, by the linkage and the contraction of the blade and the gear structure built in the cup holder body, and by pulling the blade or twisting the middle plate to drive the built-in gear structure to rotate, the elastic structure is compresses to store energy, and the tooth-shaped structure of the braking structure is connected to the tooth-shaped structure at the lower portion of the middle plate, while the clamping volume of the blades expands. The elastic structure is controlled to elongate and release energy, the expanded volume of the blades maintains, and it is easy to put different sizes of water cups in. When a water cup with a certain gravitational potential energy is putted in, the contacting portion of the triggering component passes through the upper and middle plates and is directly connected to the braking structure. When the water cup presses downwards due to the gravity, the triggering component and the braking structure are driven to move downwards, the braking structure is separated from the tooth-shaped structure of the middle plate, allowing the elastic structure to elongate and release energy. The gear structure is driven to rotate, the middle plate rotates in the counterclockwise direction. At the same time, the blades automatically contract to adapt to different sizes of water cups, and stable clamping effect can be achieved. The shapes, volumes and sizes of containers such as water cups are different, and by pulling the blade or twisting the middle plate to drive the internal gear structure to expand the clamping space of the blades, and then by utilizing the influence of downward force (such as the gravity of a water cup or the pressure from hands), the trigger the component is automatically contracted, to adapt to different sizes of the containers. Universality is high, it is convenient to use, and the clamping stability is high. By the action of internal mechanical transmission, it does not depend on a vehicle's power system. Using steps are few, it is easy to operate, and the operating steps by drivers during driving are reduced. Driving safety can be enhanced.

In order to make the above purposes, features, and advantages of the present application more obvious and understandable, preferred embodiments are provided hereinafter, and combining with the accompanying drawings, a detailed description is given as follows.

BRIEF DESCRIPTION OF DRAWINGS

In order to more clearly illustrate technical solutions of embodiments of the present application, accompanying drawings which need to be used in the embodiments are introduced briefly below. It should be understood that the accompanying drawings below merely show some embodiments of the present application, therefore should not be considered as limitation to the scope. Those ordinarily skilled in the art could also obtain other relevant accompanying drawings according to these accompanying drawings, without using any creative effort.

DETAILED DESCRIPTION

In order to make purposes, technical solutions, and advantages of the embodiments of the present application clearer, the technical solutions in the embodiments of the present application will be described clearly and completely below in conjunction with accompanying drawings in the embodiments of the present application, and apparently, the embodiments described are some but not all embodiments of the present application. Generally, components in the embodiments of the present application described and shown in the accompanying drawings herein may be arranged and designed in various different configurations Please refer to FIGS. 1 to 13, the embodiments of the present application provide an expandable adaptive cup holder.

Figure 1:
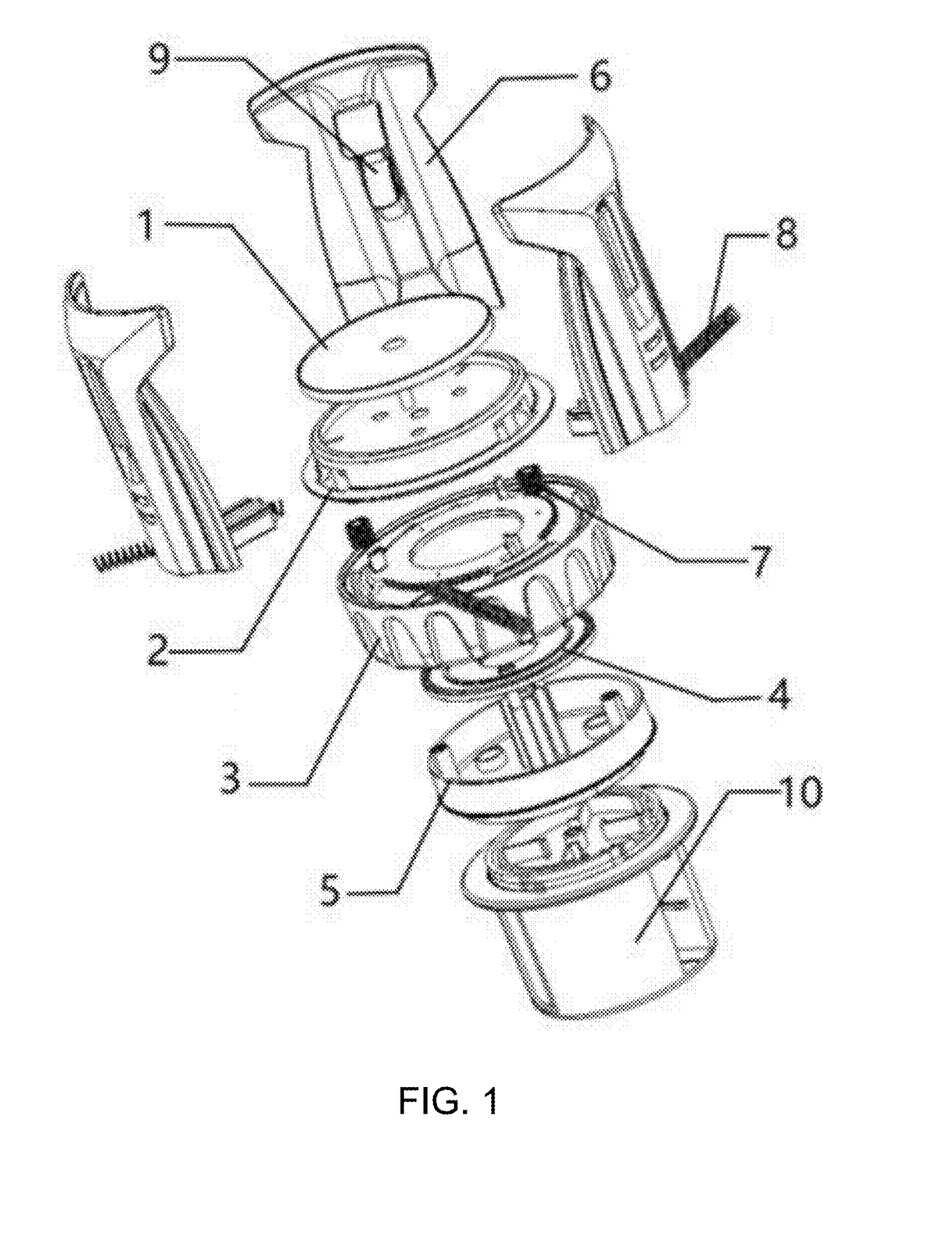
FIG. 1 shows an exploded view of an expandable adaptive cup holder provided in an embodiment of the present application.
Figure 2:
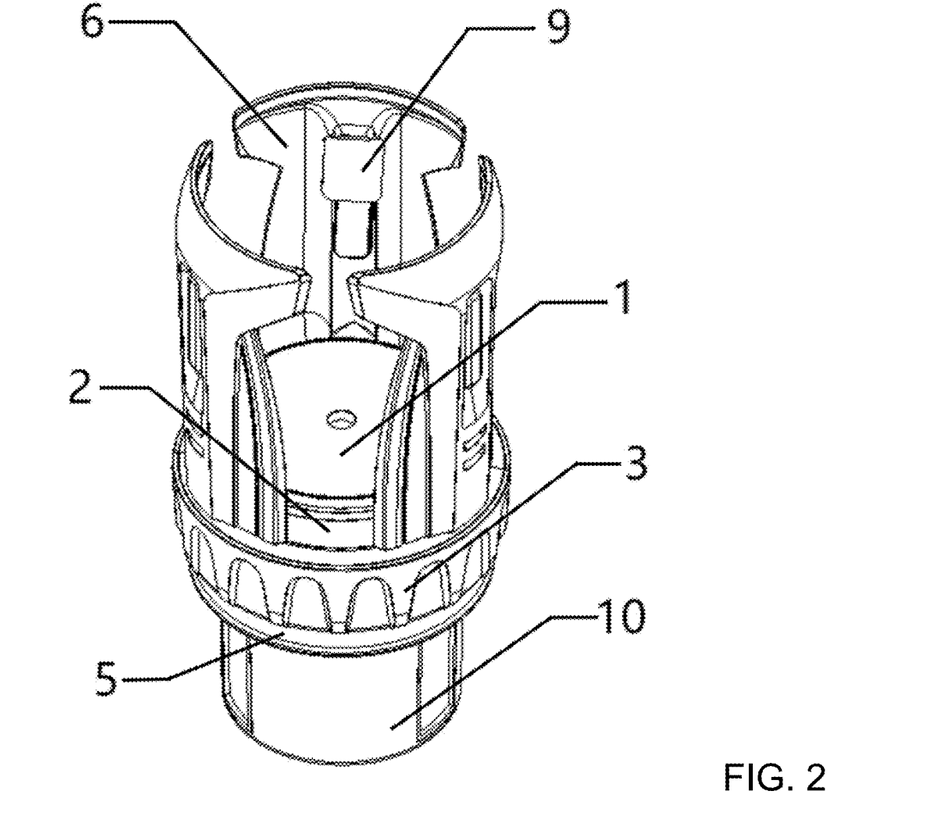
FIG. 2 shows a schematic view of the overall structure of the expandable adaptive cup holder provided in the embodiment of the present application.

As shown in FIG. 1, a blade part of the adaptive cup holder is comprised of a blade body 6 and a clamping tongue 9, a cup holder body part of the adaptive cup holder is comprised of a triggering component 1, an upper plate 2, a middle plate 3, a braking structure 4, a lower plate 5, a gear 7 and an elastic structure 8, and a base 10 is at the lowest end thereof. The base 10 is fixed and connected to the lower plate 5, is mainly installed in circular cup slots in various application scenarios, such as vehicle-mounted cup slots, and is integrated with the circular cup slots into one piece. The space utilization is improved, and the stability and convenience of clamping is enhanced.

A blade slid groove 605 of the blade is installed on a slide rail 205 of the upper plate, a gear structure 703 is installed on a gear groove 203 of the upper plate, and a blade middle groove 603 is then passed through the gear groove 203 of the upper plate to engage a tooth-shaped structure 608 at the bottom end of the blade with the gear structure 708. Then, a tooth-shaped structure 308 of the middle plate is engaged with the gear structure 708, both ends 804 of the elastic structure are respectively connected to a supporting point for fixing 204 on the upper plate and a supporting point for fixing 304 on the middle plate. At the same time, both ends of an elastic object (such as a spring) are respectively installed on a supporting rod 406 at the lower end of the braking structure and a groove 506 of an elastic object (such as a spring) of the lower plate. The braking structure is lifted upwards to connect a wedge-shaped and tooth-shaped structure 409 at the upper end of the braking structure with a wedge-shaped and tooth-shaped structure 309 at the lower end of the middle plate. At the same time, a triggering portion 101 of the triggering component 1 passes through an opening 201 of the upper plate and an opening 301 of the middle plate, to connect with a groove 401 at the upper end of the braking structure. At the same time, the clamping tongue 9 is snapped into a clamping tongue groove 612 at the upper end of the blade by a snapping portion 912. A water cup is clamped by elastic tongues 921 and 922. The cup holder body part is integrated by screws passing sequentially through the opening 102 of the trigger assembly 1, the upper plate opening 202, the opening 301 of the middle plate, and the central opening of the braking structure 4, then threadedly engaging with the screw holes 502 on the lower plate. Similarly, the upper plate 1 and the lower plate 5 can be fixedly connected by passing screws through the gear groove 203 of the upper plate and the lower plate screw holes 503.

Figure 3:
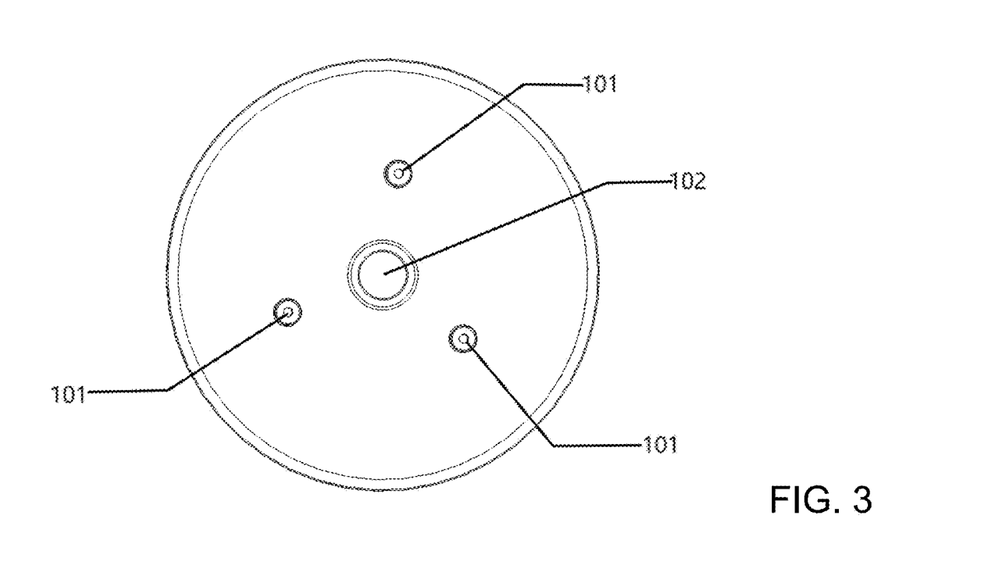
FIG. 3 shows a schematic view of a triggering component structure of the expandable adaptive cup holder provided in the embodiment of the present application.
Figure 4:
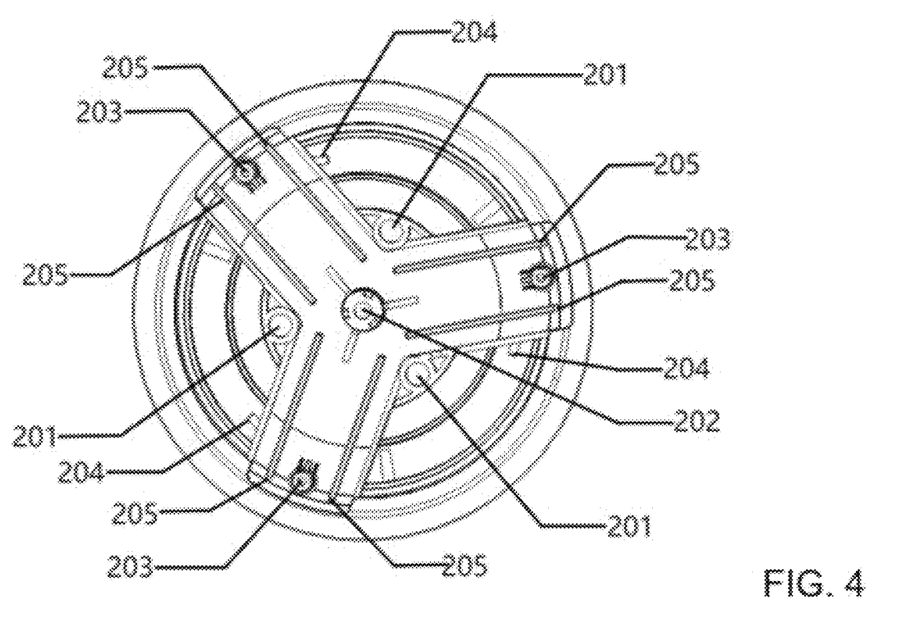
FIG. 4 shows a top view of an upper plate structure of the expandable adaptive cup holder provided in the embodiment of the present application.
Figure 5:
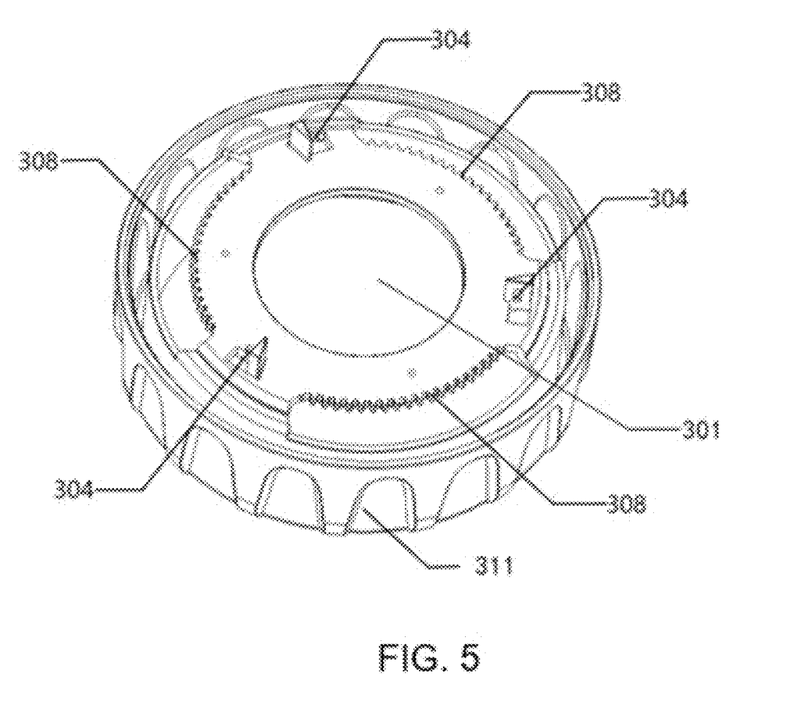
FIG. 5 shows a side view of a middle plate structure of the expandable adaptive cup holder provided in the embodiment of the present application.
Figure 6:
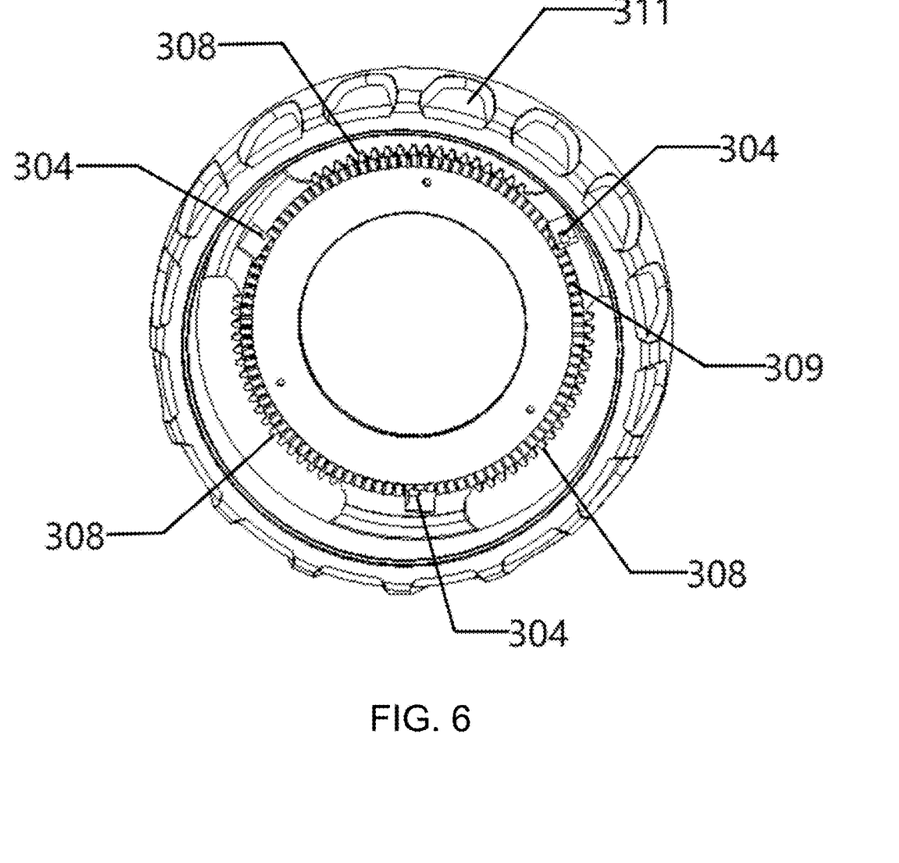
FIG. 6 shows a bottom view of a blade structure of the expandable adaptive cup holder provided in the embodiment of the present application.
Figure 7:
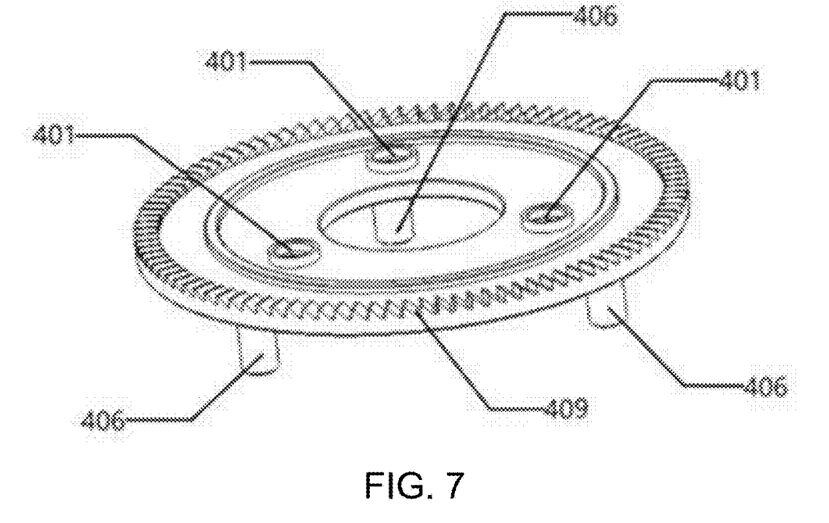
FIG. 7 shows a schematic view of a braking structure of the expandable adaptive cup holder provided in the embodiment of the present application.
Figure 8:
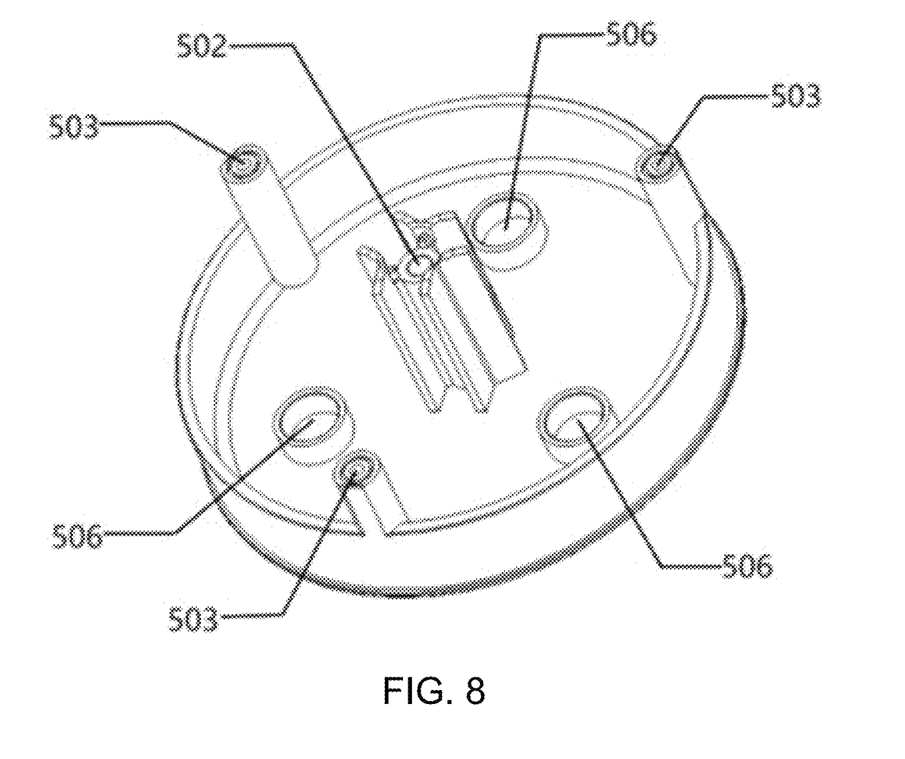
FIG. 8 shows a schematic view of a lower plate structure of the expandable adaptive cup holder provided in the embodiment of the present application.
Figure 9:
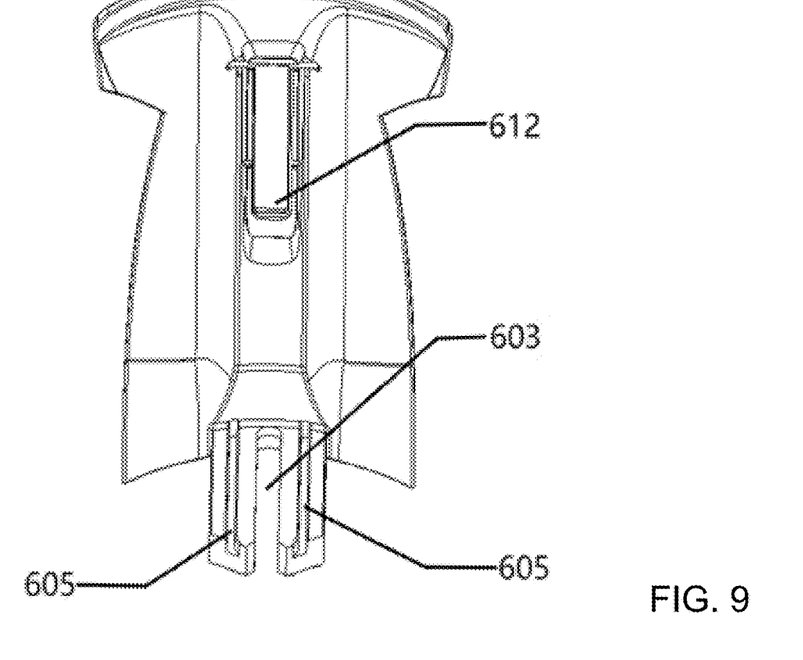
FIG. 9 shows a schematic view of the blade structure of the expandable adaptive cup holder provided in the embodiment of the present application.
Figure 10:
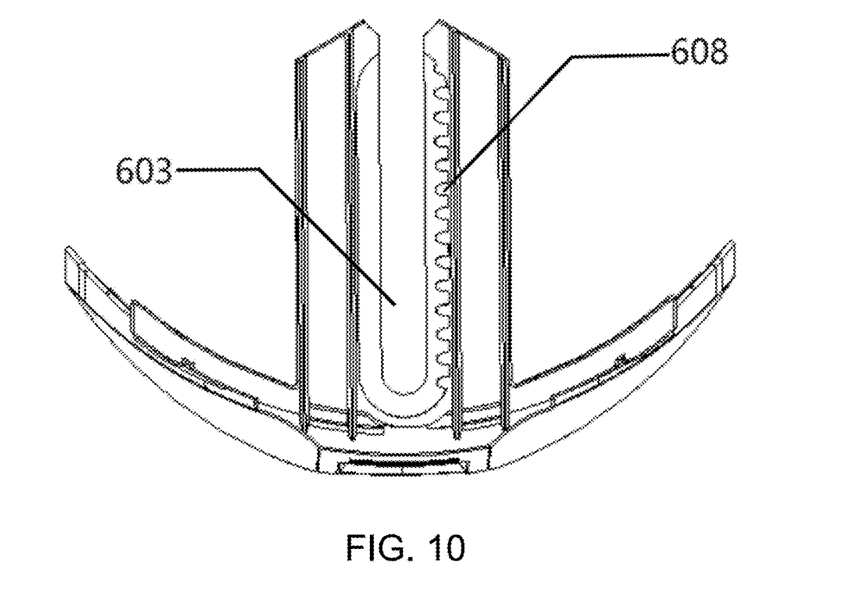
FIG. 10 shows a schematic view of the blade structure of the expandable adaptive cup holder provided in the embodiment of the present application.
Figure 11:
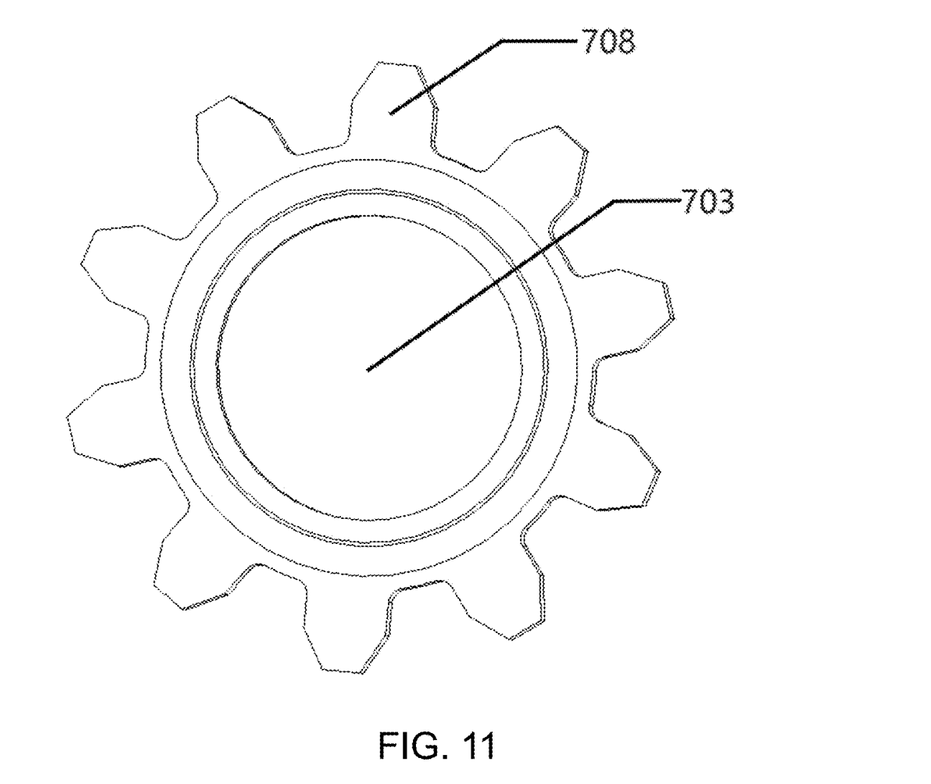
FIG. 11 shows a schematic view of a gear structure of the expandable adaptive cup holder provided in the embodiment of the present application.
Figure 12:
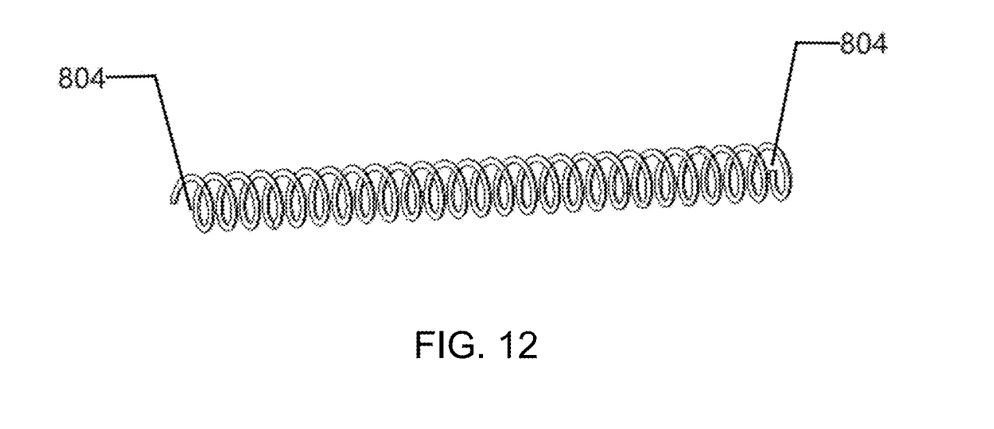
FIG. 12 shows a schematic view of an elastic structure of the expandable adaptive cup holder provided in the embodiment of the present application.
Figure 13:
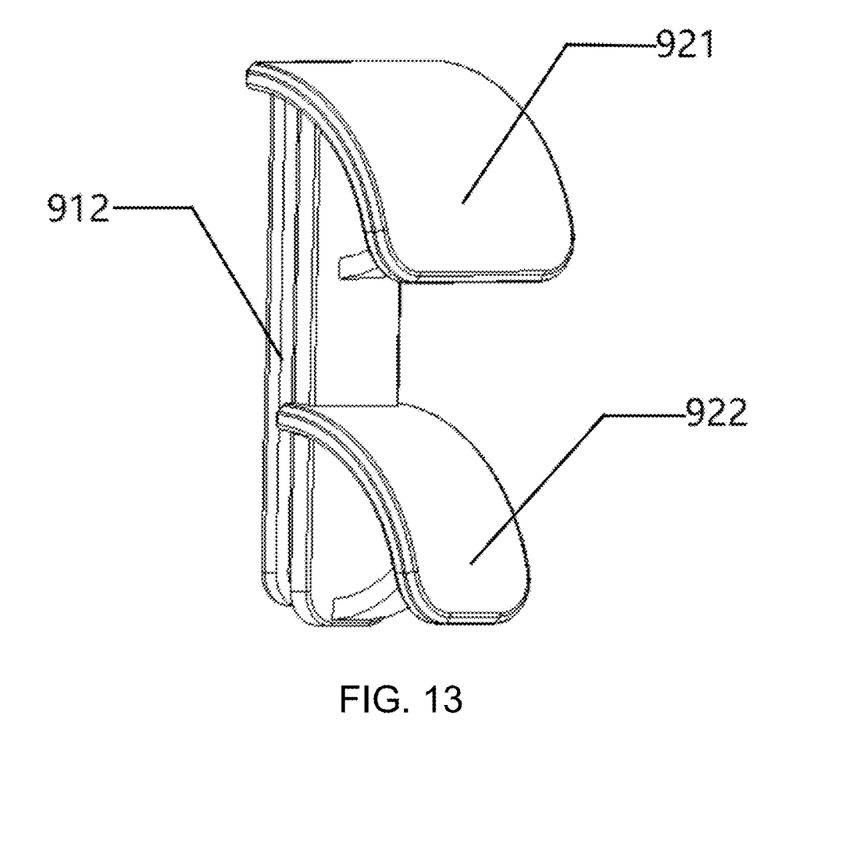
FIG. 13 shows a schematic view of a clamping tongue of the expandable adaptive cup holder provided in the embodiment of the present application.

In one of the embodiments, the triggering component 1 is arranged in a clamping space surrounded by the blades. When a user puts a water cup into the clamping space, the water cup would naturally fall due to its own weight, and the bottom portion of the water cup would contact with a contacting portion of the triggering component 1, thereby the triggering component 1 is pressed downwards. The braking structure 4 contacting with the triggering portion of the triggering component 1 is detached from the middle plate, thereby the energy stored in an elastic potential energy storage component is released. The blades would automatically contract and tighten and fit to the cup wall, and the purpose of adapting to the size of the cup body can be achieved. In one of the examples of the triggering component 1 provided in the embodiment of the present application, the contacting portion may be a circular plane having a bearing surface, wherein the circular plane may also be arranged with a flexible buffering portion. The triggering portion may be of three cylinders extending downwards from the bearing surface and passing through the upper and middle plates. In other optional examples, the contacting portion of the triggering component 1 may not have a continuous plane, for example, the triggering component 1 is of three cylinders, and the first end of the cylinder is the contacting portion, the second end is the triggering portion. In addition, in other optional examples, the triggering component may be arranged at other positions of the cup holder body, such as arranged on the side wall, and the elastic potential energy storage component is triggered to release energy through manually pressing by the user, which will not be repeated here.

[Opening Method]

<Path 1>

By directly pulling the blades to expand the volume of the clamping space surrounded by the blades, the blades can be moved in a direction parallel to the direction of the slide rail 205 of the upper plate by utilizing the fixing of the blade middle slot 603 to the gear groove 203 of the upper plate, as well as the fixing of the blade slid groove 605 to the slid rail. Then, by utilizing the connection of the tooth-shaped structure 608 at the bottom end of the blade to the gear structure 708, utilizing the rotation of the gear structure driven by pulling outwards the blade, and further utilizing the connection of the gear structure 708 to the tooth-shaped structure 308 of the middle plate, the middle plate is driven to rotate in a clockwise direction, and the elastic structure both ends of which are fixed to the supporting point for fixing 204 on the upper plate and the supporting point for fixing 304 on the middle plate is compressed to store elastic potential energy. At the same time, by utilizing the connection of the wedge-shaped and tooth-shaped structure 309 at the lower end of the middle plate to the wedge-shaped and tooth-shaped structure 409 at the upper end of the braking structure, the elastic structure can only be compressed in the clockwise direction and cannot release energy in the counterclockwise direction, which plays a role in compressing the spring to store energy and fixing the degree of opening and closing of the blades.

<Path 2>

By directly twisting the middle plate 3 in the clockwise direction, the elastic structure both ends of which are fixed to the supporting point for fixing 204 on the upper plate and the supporting point for fixing 304 on the middle plate is directly compressed to store elastic potential energy. Then, by utilizing the engagement of the tooth-shaped 308 of the middle plate with the gear structure 708, the gear structure 708 engages with the tooth-shaped structure 608 at the bottom end of the blade. When the middle plate rotates in the clockwise direction, the tooth-shaped structure 308 of the middle plate drives the gear structure 708 to rotate, and further drives the tooth-shaped structure 608 at the bottom end of the blade, the blade is moved away from the center of the circle along the slid rail 205 of the upper plate, and the volume of the clamping space surrounded by the blades is expanded. At the same time, by utilizing the connection of the wedge-shaped and tooth-shaped structure 309 at the lower end of the middle plate to the wedge-shaped and tooth-shaped structure 409 at the upper end of the braking structure, the elastic structure can only be compressed in the clockwise direction and cannot release energy in the counterclockwise direction, which plays a role in compressing the spring to store energy and fixing the degree of opening and closing of the blades. The outer surface of the middle plate 3 is provided with a corrugated structure 311

In the preferred examples provided in the present application, the elastic structure is of three springs. In other optional examples, the clastic structure may also be other members having elasticity, such as an elastic rubber or a torsion spring that can store elastic potential energy. The number of the elastic structure may also be 2, 3 or more.

[Closing Method]

By utilizing the influence of downward force (such as the gravity of a water cup or the pressure from hands), the triggering component is moved downwards. As the contacting portion 101 of the triggering component is directly connected to the groove 401 at the upper end of the braking structure, the braking structure is moved downwards, and the wedge-shaped and tooth-shaped structure 409 at the upper end of the braking structure is separated from the wedge-shaped and tooth-shaped structure 309 at the lower end of the middle plate. The elastic structure both ends of which are fixed to the supporting point for fixing 204 on the upper plate and the supporting point for fixing 304 on the middle cannot be prevented from elongating and releasing elastic potential energy, thereby the middle plate is rotated in the counterclockwise direction. As the tooth-shaped structure 308 of the middle plate engages with the gear structure 708, and the gear structure 708 engages with the tooth-shaped structure 608 at the bottom end of the blade, the tooth-shaped structure 308 of the middle plate is rotated in the counterclockwise direction to drive the gear structure 708 to rotate and drive the blades to move towards the center of the circle in a return direction along the slid rail 205 of upper plate, and the automatic contraction function of the blades can be achieved. At the same time, the blade is installed with the clamping tongue 9, and the elastic tongues 921 and 922 thereon can clamp the outer edge of the cup better when the blades contract, and the purpose of adapting the size of the cup can be achieved.

The advantageous effect of the present application is that when the user applies different sizes of water cups, the expandable adaptive cup holder can release elastic potential energy after the user puts the water cup in, the blades are contracted to clamp the outer edge of the cup wall, and the purpose of adapting to the size of the water cup can be achieved.

Finally, it should be noted that the above embodiments, which are only specific embodiments of the present application, are intended to illustrate but not limit the technical solutions of the present application, and the protection scope of the present application is not limited thereto. Although the present application has been described in detail with reference to the aforementioned embodiments, it should be understood by those skilled in the art that any person skilled in the art, within the technical scope disclosed in the present application, can still modify or vary easily the technical solutions recited in the aforementioned embodiments, or equivalently replace some technical features. And such modifications, variations or replacements do not substantially depart from the gist and scope of the technical solutions of the embodiments of the present application, which are intended to be within the protection scope of the present application. Therefore, the protection scope of the present application should be subject to the protection scope of the claims.

The invention claimed is:

1. An expandable adaptive cup holder, comprising a cup holder body and a blade slidably connected to the cup holder body, wherein the cup holder body comprises:
    an elastic potential energy storage component arranged inside the cup holder body; and
    a triggering component arranged on the cup holder body, the triggering component comprises a contacting portion and a triggering portion extending into the cup holder body and contacting with the elastic potential energy storage component;
    wherein the cup holder body comprises an upper plate, a middle plate and a lower plate, and
    the triggering portion passes through the upper plate and the middle plate and contacts with the elastic potential energy storage component.

2. The expandable adaptive cup holder according to claim 1, wherein the elastic potential energy storage component comprises a braking structure, and
    the triggering portion contacts with the braking structure.

3. The expandable adaptive cup holder according to claim 2, wherein the braking structure is arranged between the middle plate and the lower plate, and
    a first wedge-shaped and tooth-shaped structure is arranged on a first surface of the braking structure.

4. The expandable adaptive cup holder according to claim 3, wherein a first groove corresponding to the triggering portion is arranged on the first surface of the braking structure.

5. The expandable adaptive cup holder according to claim 4, wherein a supporting rod is arranged on a second surface of the braking structure.

6. The expandable adaptive cup holder according to claim 3, wherein a second wedge-shaped and tooth-shaped structure corresponding to the first wedge-shaped and tooth-shaped structure is arranged on a third surface of the middle plate facing the first surface of the braking structure.

7. The expandable adaptive cup holder according to claim 6, wherein a second groove corresponding to the supporting rod is arranged on the lower plate, and
    a first elastic member is arranged between the supporting rod and the second groove, to make the first wedge-shaped and tooth-shaped structure and the second wedge-shaped and tooth-shaped structure come into contact.

8. The expandable adaptive cup holder according to claim 1, wherein the elastic potential energy storage component comprises a second elastic member arranged between the upper plate and the middle plate,
    a first supporting point for fixing is arranged on the upper plate,
    a second supporting point for fixing is arranged on the middle plate, and
    both ends of the second elastic member are fixed and connected to the first supporting point for fixing and the second supporting point for fixing respectively.

9. The expandable adaptive cup holder according to claim 8, wherein a third tooth-shaped structure engaging with a gear arranged on the upper plate is arranged on the blade.

10. The expandable adaptive cup holder according to claim 9, wherein a fourth tooth-shaped structure engaging with the gear is arranged on the middle plate.

\* \* \* \* \*